(12) United States Patent
Brennan et al.

(10) Patent No.: US 9,208,348 B1
(45) Date of Patent: Dec. 8, 2015

(54) SYSTEMS AND METHODS FOR MANAGING ENCRYPTED FILES WITHIN APPLICATION PACKAGES

(71) Applicant: Symantec Corporation, Mountain View, CA (US)

(72) Inventors: James E. Brennan, Rancho Palos Verdes, CA (US); Nalini Ganapati, Portland, OR (US)

(73) Assignee: Symantec Corporation, Mountain View, CA (US)

( * ) Notice: Subject to any disclaimer, the term of this patent is extended or adjusted under 35 U.S.C. 154(b) by 52 days.

(21) Appl. No.: 14/155,792

(22) Filed: Jan. 15, 2014

(51) Int. Cl.
*G06F 21/60* (2013.01)
*G06F 13/42* (2006.01)
*G06F 21/62* (2013.01)

(52) U.S. Cl.
CPC .................................. *G06F 21/629* (2013.01)

(58) Field of Classification Search
CPC ... G06F 21/602; G06F 21/72; G06F 12/1408; G06F 21/71; H04L 9/0866
See application file for complete search history.

(56) References Cited

U.S. PATENT DOCUMENTS

| | | | |
|---|---|---|---|
| 8,892,876 B1 * | 11/2014 | Huang et al. | 713/165 |
| 8,984,299 B1 * | 3/2015 | Yi et al. | 713/189 |
| 2002/0147044 A1 * | 10/2002 | Jakobsson et al. | 463/42 |
| 2005/0141706 A1 * | 6/2005 | Regli et al. | 380/44 |
| 2005/0173518 A1 * | 8/2005 | Takayama | 235/380 |
| 2005/0202803 A1 * | 9/2005 | Mahalal | 455/410 |
| 2007/0127418 A1 * | 6/2007 | Pekkala et al. | 370/338 |
| 2010/0292556 A1 * | 11/2010 | Golden | 600/364 |
| 2011/0113473 A1 * | 5/2011 | Corda et al. | 726/3 |
| 2011/0320359 A1 * | 12/2011 | Li et al. | 705/71 |
| 2012/0222129 A1 * | 8/2012 | Racciopi et al. | 726/27 |
| 2013/0117850 A1 * | 5/2013 | Britton et al. | 726/23 |
| 2013/0117854 A1 * | 5/2013 | Britton et al. | 726/24 |

OTHER PUBLICATIONS

"How to make apk Secure. Protecting from Decompile", http://stackoverflow.com/questions/6235290/how-to-make-apk-secure-protecting-from-decompile, as accessed Dec. 10, 2013, Stack Overflow, (Jul. 31, 2012).
Elenkov, Nikolay, "Using app encryption in Jelly Bean", http://nelenkov.blogspot.com/2012/07/using-app-encryption-in-jelly-bean.html, as accessed Dec. 10, 2013, (Jul. 6, 2012).

(Continued)

*Primary Examiner* — Yonas Bayou
(74) *Attorney, Agent, or Firm* — ALG INTELLECTUAL PROPERTY, LLC

(57) ABSTRACT

A computer-implemented method for managing encrypted files within application packages may include (1) identifying an individual component within an application package that requires encryption, (2) creating an encrypted file by encrypting the individual component, (3) decomposing the encrypted file into (a) a primary encrypted file that contains an initial portion of the encrypted file that matches a critical attribute of the individual component and (b) an auxiliary encrypted file that contains the remaining portion of the encrypted file, and (4) replacing, within the application package, the individual component with the primary encrypted file and the auxiliary encrypted file. Various other methods, systems, and computer-readable media are also disclosed.

20 Claims, 7 Drawing Sheets

(56) References Cited

OTHER PUBLICATIONS

"MobileIron—The Platform for Mobile IT", http://www.mobileiron.com/, as accessed Dec. 10, 2013, (Jan. 17, 2008).

"User Virtualization, Desktop Management, Mobile Management—AppSense", http://www.appsense.com/, as accessed Dec. 10, 2013, (Nov. 29, 2001).

* cited by examiner

SYSTEMS AND METHODS FOR MANAGING ENCRYPTED FILES WITHIN APPLICATION PACKAGES

BACKGROUND

When creating an application for a mobile computing device, developers often bundle the data and resources associated with or utilized by the application into a single application package file. Some mobile operating systems (such as iOS) unpack application package files during installation, which may enable security software to encrypt the individual components within an application package file and then seamlessly decrypt and provide access to the same during runtime. Other mobile operating systems, however, may directly read application package files during runtime instead of unpacking the same, which may frustrate attempts by security software to successfully encrypt individual components within an application package file and provide access to the same during runtime.

For example, some operating systems (such as ANDROID) read and store various attributes (such as file names and sizes) of the individual components that make up an application package file during device startup. When these individual components are encrypted, however, the encryption process may change one or more of these attributes. Unfortunately, because individual components are called for execution using their stored attributes, if an attribute of a component is altered during the encryption process, a runtime call for the same may result in an error or prevent the application in question from properly executing.

As such, the instant disclosure identifies and addresses a need for successfully encrypting individual components within an application package file and providing access to the same during runtime.

SUMMARY

As will be described in greater detail below, the instant disclosure describes various systems and methods for successfully encrypting individual components within an application package file and providing access to the same during runtime. In one example, a computer-implemented method for accomplishing such a task may include (1) identifying an individual component within an application package that requires encryption, (2) creating an encrypted file by encrypting the individual component, (3) decomposing the encrypted file into (a) a primary encrypted file that contains an initial portion of the encrypted file that matches a critical attribute of the individual component and (b) at least one auxiliary encrypted file that contains the remaining portion of the encrypted file, and (4) replacing, within the application package, the individual component with the primary encrypted file and the auxiliary encrypted file. In some examples, the critical attribute of the individual component may include a size of the individual component.

In some embodiments, before decomposing the encrypted file into the primary and auxiliary encrypted files, the method may include determining that at least one critical attribute of the encrypted file does not match the critical attribute of the individual component. In these embodiments, the method may then include decomposing the encrypted file in response to determining that at least one critical attribute of the encrypted file does not match the critical attribute of the individual component.

In some embodiments, the method may include determining that the individual component has been compressed and then decompressing the individual component prior to encrypting the individual component. In these embodiments, upon decompressing the individual component, the method may further include identifying the critical attribute of the individual component and then recompressing the individual component. In addition, recompressing the individual component may include identifying a compression algorithm that was originally used to compress the individual component and recompressing the individual component using the same compression algorithm that was originally used to compress the individual component.

In some examples, encrypting the individual component may include determining that the individual component has been compressed and then directly encrypting the compressed individual component. In these examples, directly encrypting the compressed individual component may include first identifying a compression algorithm that was used to compress the individual component and then directly extracting compressed data from the individual component without decompressing the same. The method may then include encrypting the compressed data, as extracted.

In some embodiments, the method may include detecting an attempt to access the individual component by monitoring access to the application package. Upon detecting the attempt to access the individual component, the method may include (1) recomposing the primary encrypted file and the auxiliary encrypted file into the encrypted file, (2) decrypting the encrypted file to derive the individual component, (3) optionally decompressing the data, and then (4) permitting access to the individual component.

In some embodiments, monitoring access to the application package may include intercepting a runtime call directed to the application package. Similarly, detecting the attempt to access the individual component may include determining that the runtime call is directed to the individual component. Furthermore, in some examples determining that the runtime call is directed to the individual component may include determining that the runtime call is directed to a component within the application package that matches both an offset value and the critical attribute associated with the individual component.

In some examples, recomposing the primary encrypted file and the auxiliary encrypted file into the encrypted file may include dynamically recomposing the primary encrypted file and the auxiliary file while the application package is executing. In addition, upon decrypting the encrypted file, the method may include determining that the individual component has been compressed and then decompressing the individual component before permitting access to the individual component.

In one embodiment, a system for implementing the above-described method may include an identification module that identifies an individual component within an application package that requires encryption. The system may also include an encryption module that creates an encrypted file by encrypting the individual component. The system may further include a decomposition module that decomposes the encrypted file into (1) a primary encrypted file that contains an initial portion of the encrypted file that matches a critical attribute of the individual component and (2) at least one auxiliary encrypted file that contains the remaining portion of the encrypted file. In addition, the system may include a replacement module that replaces, within the application package, the individual component with the primary encrypted file and the auxiliary encrypted file. Finally, the system may include a processor configured to execute each module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an individual component within an application package that requires encryption, (2) create an encrypted file by encrypting the individual component, (3) decompose the encrypted file into (a) a primary encrypted file that contains an initial portion of the encrypted file that matches a critical attribute of the individual component and (b) at least one auxiliary encrypted file that contains the remaining portion of the encrypted file, and (4) replace, within the application package, the individual component with the primary encrypted file and the auxiliary encrypted file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
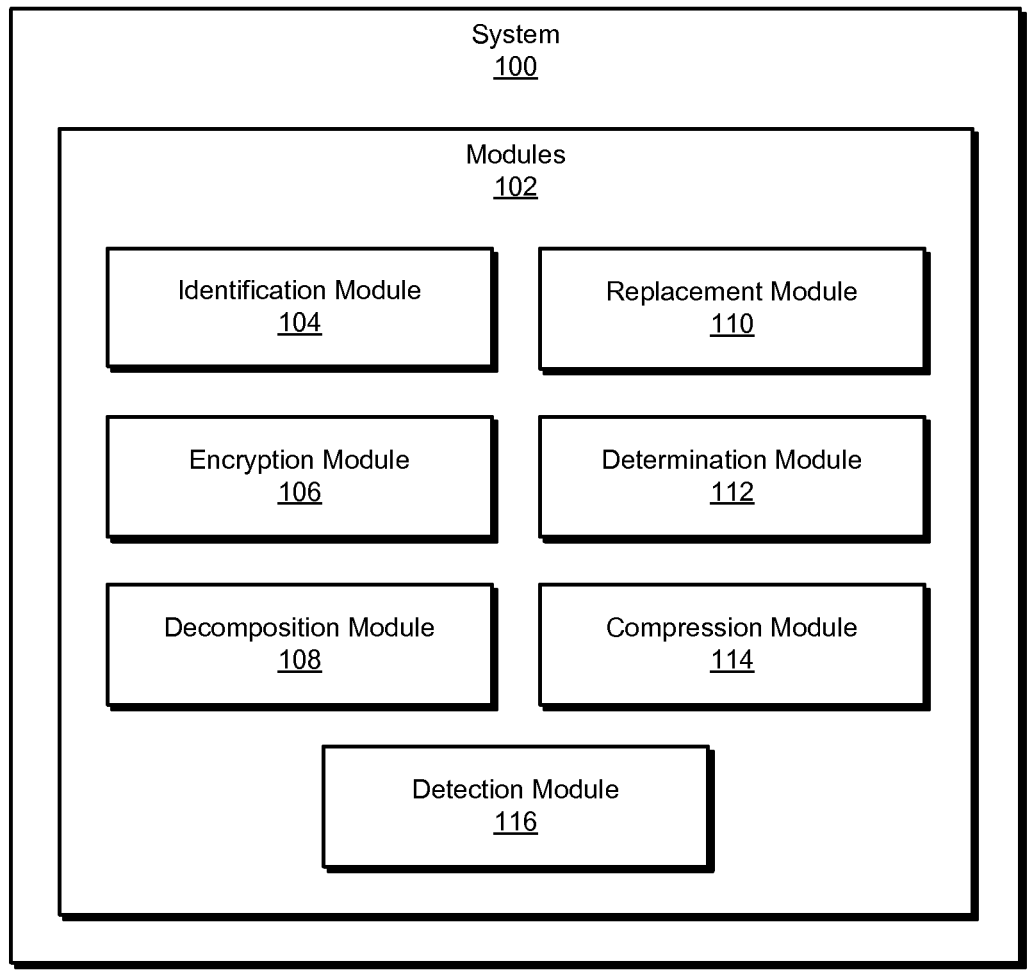
FIG. 1 is a block diagram of an exemplary system for managing encrypted files within application packages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for managing encrypted files within application packages. As will be explained in greater detail below, by creating encrypted files that match the critical attributes of individual, unencrypted components of an application package, the systems and methods disclosed herein may enable applications to successfully encrypt, decrypt, and read files within the application package during runtime.

Figure 2:
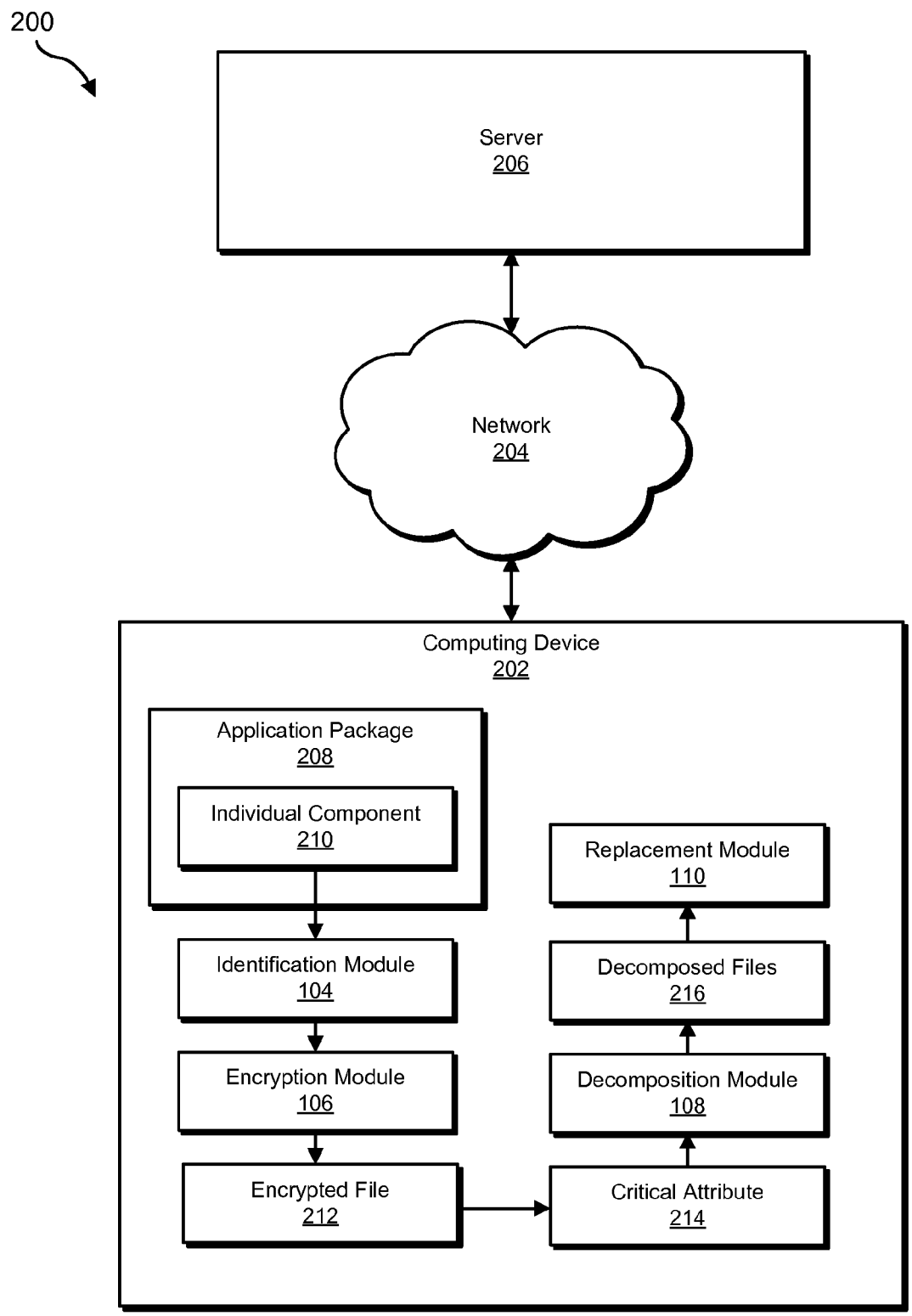
FIG. 2 is a block diagram of an additional exemplary system for managing encrypted files within application packages.

The following will provide, with reference to FIGS. 1-2, detailed descriptions of exemplary systems for managing encrypted files within application packages. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for managing encrypted files within application packages. As illustrated in this figure, exemplary system 100 may include one or more modules 102 for performing one or more tasks. For example, and as will be explained in greater detail below, exemplary system 100 may include an identification module 104 that identifies an individual component within an application package that requires encryption. Exemplary system 100 may also include an encryption module 106 that creates an encrypted file by encrypting the individual component.

In addition, and as will be described in greater detail below, exemplary system 100 may include a decomposition module 108 that decomposes the encrypted file into (1) a primary encrypted file that contains an initial portion of the encrypted file that matches a critical attribute of the individual component and (2) at least one auxiliary encrypted file that contains the remaining portion of the encrypted file. Exemplary system 100 may also include a replacement module 110 that replaces, within the application package, the individual component with the primary encrypted file and the auxiliary encrypted file. In addition, exemplary system 100 may include a determination module 112 that determines that at least one critical attribute of the encrypted file does not match the critical attribute of the individual component.

Exemplary system 100 may also include a compression module 114 that compresses, decompresses, and analyzes the compression status of the individual component. Finally, exemplary system 100 may include a detection module 116 that detects and analyzes an attempt to access the individual component. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to manage encrypted files within application packages. For example, and as will be described in greater detail below, identification module 104 may cause computing device 202 to identify an individual component (e.g., individual component 210) within an application package (e.g., application package 208) that requires encryption. Encryption module 106 may then cause computing device 202 to create an encrypted file (e.g., encrypted file 212) by encrypting the individual component. Next, decomposition module 108 may cause computing device 202 to decompose the encrypted file into (1) a primary encrypted file that contains an initial portion of the encrypted file that matches a critical attribute of the individual component and (2) at least one auxiliary encrypted file that contains the remaining portion of the encrypted file. Finally, replacement module 110 may cause computing device 202 to replace, within the application package, the individual component with the primary and auxiliary encrypted files, which are collectively illustrated as decomposed files 216 in FIG. 2.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of identifying, encrypting, analyzing, storing, and/or manipulating files within an application package. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
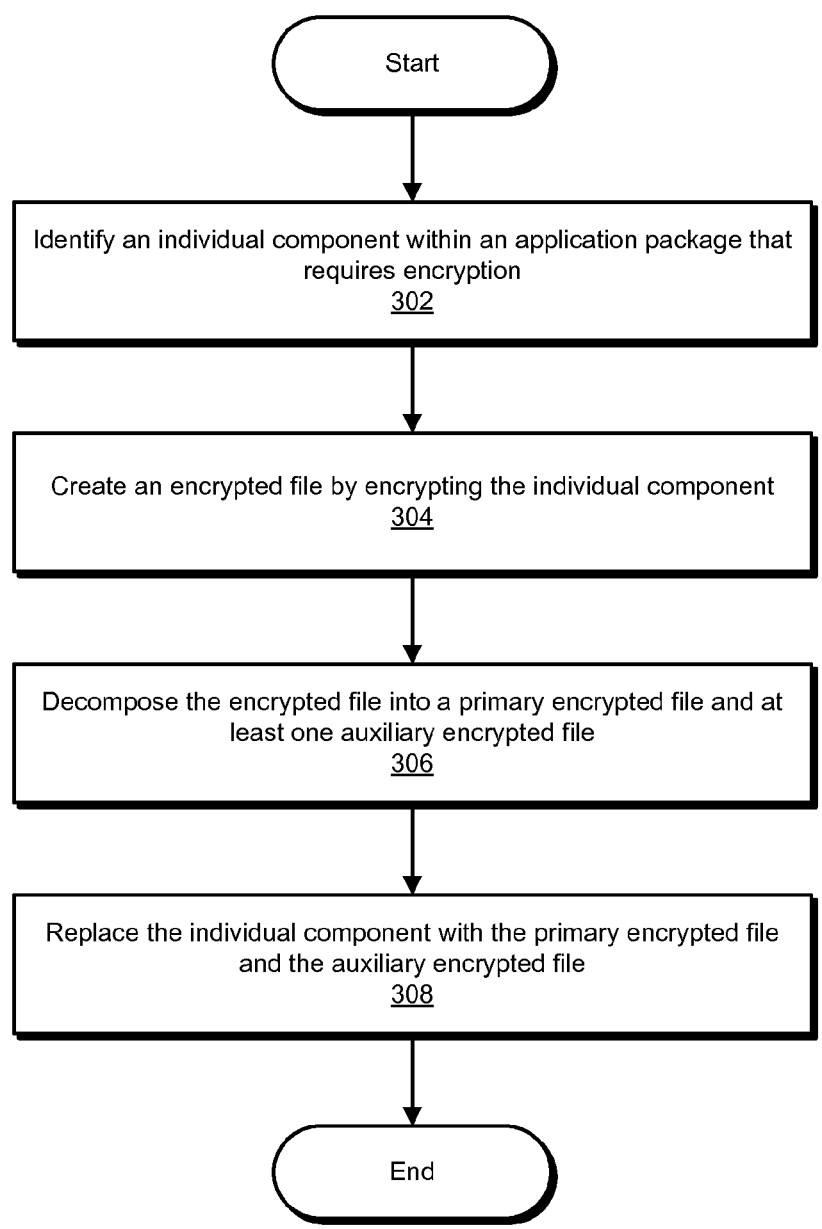
FIG. 3 is a flow diagram of an exemplary method for managing encrypted files within application packages.

FIG. 3 is a flow diagram of an exemplary computer-implemented method 300 for managing encrypted files within application packages. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify an individual component within an application package that requires encryption. For example, identification module 104 may, as part of computing device 202 in FIG. 2, identify individual component 210 within application package 208.

As used herein, the phrase "application package" generally refers to a collection of computer-readable instructions and/or information used to distribute, install, and/or execute an application on an operating system, including mobile operating systems such as ANDROID or iOS. In some examples, application packages may be created by packaging, or "bundling," the individual files, data, and/or resources of an application into a single file (e.g., an ANDROID ".apk" file). Examples of the individual components that make up an application package include, without limitation, an application's code, resources, assets, manifest file, certificates, and/or any other type or form of data or information associated with or utilized by an application.

The systems described herein may identify individual components that require encryption within an application package (such as individual component 210 of application package 208 in FIG. 2) in a variety of ways. For example, identification module 104 may determine (e.g., during a packaging or repackaging operation) that individual component 210 has been marked for encryption and/or that individual component 210 has not yet been encrypted. In some examples, identification module 104 may determine that one or more components of application package 208 should not be encrypted (because, e.g., encrypting certain components may cause application package 208 to fail during execution). In these examples, identification module 104 may compile a list of components to remain unencrypted (i.e., an encryption exception list). In this example, identification module 104 may identify individual component 210 from the components not listed on the encryption exception list.

In some examples, during this identification process identification module 104 may also identify and/or record one or more critical attributes of individual component 210. As used herein, the phrase "critical attribute" generally refers to any attribute, characteristic, or descriptor of a file that, if altered from its original state, may interfere with execution of an application package component. In some examples, critical attributes may be necessary to identify the component during certain tasks (e.g., runtime calls). For example, if a critical attribute is altered during any process (e.g., encryption) before runtime, the component may be unable to be identified. Examples of critical attributes include, without limitation, the size of a component, the file name of a component, the storage location of a component, and/or any other suitable attribute.

In some examples, identification module 104 may also determine during step 302 whether individual component 210 and/or application package 208 has been compressed. For example, identification module 104 may determine that the components of application package 208, including individual component 210, were compressed during the process of packaging them into application package 208. In this example, identification module 104 may identify and/or record the specific compression algorithm that was used to compress individual component 210. For example, identification module 104 may determine that the components of application package 208 were compressed using Lempel-Ziv compression methods, Burrows-Wheeler compression methods, or any other compression algorithm. In some examples, if identification module 104 determines that individual component 210 has been compressed, compression module 114 may decompress individual component 210 before proceeding with further (e.g., before identifying one or more critical attributes of individual component 210 and/or before encrypting individual component 210).

In some examples, identification module 104 may wait to identify one or more critical attributes of individual component 210 until after compression module 114 has decompressed individual component 210. In these examples, compression module 114 may either (1) recompress individual component 210 after identification module 104 identifies the critical attribute(s) of the decompressed individual component or (2) encrypt the decompressed individual component (as detailed below). Compression module 114 may recompress individual component using any suitable compression algorithm. For example, if identification module 104 identified and/or recorded the specific compression algorithm that was originally used to compress individual component 210, compression module 114 may recompress individual component 210 and/or application package 208 using that same algorithm or any similar algorithm. In this way, the systems described herein may accurately identify the critical attribute of the decompressed individual component while still preserving the formatting and allocated storage of the original files.

Returning to FIG. 3, at step 304 the systems described herein may create an encrypted file by encrypting the individual component identified in step 302. For example, encryption module 106 may, as part of computing device 202 in FIG. 2, create encrypted file 212 by encrypting individual component 210.

The systems described herein may encrypt individual component 210 in a variety of ways using any of a variety of encryption algorithms. In some examples, encryption module 106 may only encrypt individual component 210. In other examples, if identification module 104 compiled an encryption exception list of components that should not be encrypted, encryption module 106 may encrypt all remaining components within application package 208 not included on the encryption exception list.

As mentioned previously, identification module 104 may have determined that individual component 210 has been compressed. In some embodiments, encryption module 106 may encrypt individual component 210 after compression module 114 has decompressed and/or recompressed individual component 210. However, in some examples encryption module 106 may directly encrypt the compressed individual component. In these examples, compression module 114 may have identified a compression algorithm that was used to compress the original component. As such, encryption module 106 may directly extract, without decompressing, compressed data from individual component 210 using a decompression algorithm that corresponds to the compression algorithm that was used to compress individual component 210. Encryption module 106 may then encrypt the compressed data, as extracted.

Figure 4:
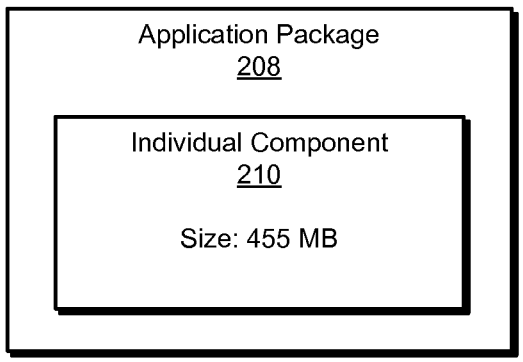
FIG. 4 is an illustration of exemplary application packages.
Figure 4:
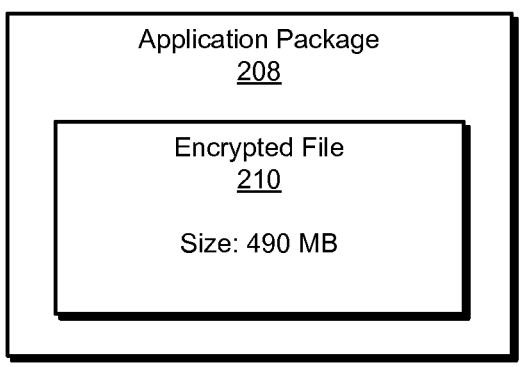

In some cases, applying an encryption algorithm to an individual component may alter certain attributes of the individual component, such as the individual component's size. For example, and as illustrated in FIG. 4, the size of encrypted file 212 may differ from the size of the original unencrypted individual component 210. As detailed above, if a critical attribute of an individual component within an application package is altered during such an encryption process (and if this altered attribute remains unaccounted for), the application in question may fail to properly execute.

Returning to FIG. 3, at step 306 the systems described herein may decompose the encrypted file into (1) a primary encrypted file that contains an initial portion of the encrypted file that matches a critical attribute of the individual component and (2) at least one auxiliary file that contains the remaining portion of the encrypted file. For example, decomposition module 108 may, as part of computing device 202 in FIG. 2, decompose encrypted file 212 into a primary encrypted file and at least one auxiliary file, collectively illustrated as decomposed files 216.

The systems described herein may decompose the encrypted file in a variety of ways. As mentioned previously, the encryption algorithm applied by encryption module 106 in step 304 to individual component 210 may alter one or more attributes of individual component 210. Some attributes, most notably size, may be altered as a direct result of the encryption process. Other attributes may be altered indirectly by the encryption process, by a compression/decompression process, and/or by any other process.

In some examples, the encryption process used to encrypt individual component 210 can be assumed to always alter a certain critical attribute, such as size, of individual component 210. In these examples, decomposition module 108 may automatically decompose encrypted file 212 into the primary encrypted file and the auxiliary encrypted file such that the size the primary encrypted file matches the size of individual component 210.

In other examples, however, the encryption process performed on individual component 210 may not always alter critical attributes of individual component 210. In these examples, determination module 112 may first determine whether the critical attributes of encrypted file 212 match the critical attributes of individual component 210 by identifying and comparing at least one critical attribute 214 of encrypted file 212 with the identified attributes of individual component 210. If determination module 112 determines that critical attribute 214 does not match the critical attributes of individual component 210, decomposition module 108 may then proceed to decompose encrypted file 212.

As an example, FIG. 4 shows a critical attribute (in this example, the size) of individual component 210 both before and after encryption. As shown in FIG. 4, the size of individual component 210 is 455 MB while the size of encrypted file 212 is 490 MB. In some examples, determination module 112 may determine, by comparing the sizes of individual component 210 and encrypted file 212, that the size of encrypted file 212 does not match the size of individual component 210 (which, in this case, represents a "critical attribute"). In other examples, decomposition module 108 may automatically assume that the size of encrypted file 212 does not match the size of individual component 210.

Figure 5:
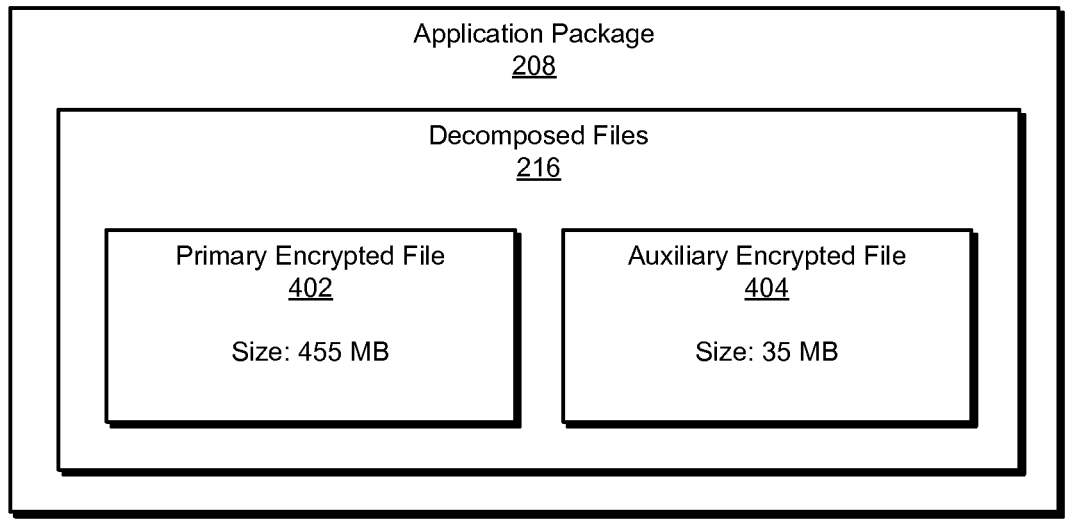
FIG. 5 is an illustration of an additional exemplary application package.

Next, decomposition module 108 may decompose encrypted file 212 into a primary encrypted file that matches the size of individual component 210 and an auxiliary file that contains any leftover data. FIG. 5 is an illustration of such an example. As previously shown in FIG. 4, identification module 104 may have determined that the file size of individual component 210 was 455 MB. Therefore, decomposition module 108 may create a primary encrypted file 402 that also contains 455 MB of data in order to match the file size of individual component 210. In some examples, the 455 MB of data stored in primary encrypted file 402 may simply be the first 455 MB stored in encrypted file 212. In other examples, however, the data may be a particular section of encrypted file 212 or a random selection of encrypted file 212.

Upon creating primary encrypted file 402, decomposition module 108 may then create an auxiliary encrypted file 404 that contains the remaining data of encrypted file 212 that was not included in primary encrypted file 402. In this example, decomposition module 108 may store the remaining 35 MB of data from encrypted file 212 (i.e., the 35 MB of data remaining from the 490 MB encrypted file 212 that was not stored in primary encrypted file 402) in auxiliary encrypted file 404.

In some examples, multiple critical attributes may differ between individual component 210 and encrypted file 212. In these examples, decomposition module 108 may create a primary auxiliary file that matches all non-matching critical attributes. In addition, if encrypted file 212 contains more data than individual component 210, decomposition module 108 may create more than one auxiliary encrypted file to store any remaining data not included in the primary encrypted file. Alternatively, decomposition module 108 may add extraneous data to the primary encrypted file if encrypted file 212 contains less data than individual component 210.

Returning to FIG. 3, at step 308 the systems described herein may replace, within the application package, the individual component with both the primary encrypted file and the auxiliary encrypted file created in step 308. For example, replacement module 110 may, as part of computing device 202 in FIG. 2, replace individual component 210 within application package 208 with decomposed files 216.

The systems described herein may replace the individual component with the primary and auxiliary encrypted files in a variety of ways. For example, replacement module 110 may move individual component 210 from application package 208 to a separate location on computing device 202 and/or another computing device and store the primary and auxiliary encrypted files at the location previously storing individual component 210. Alternatively, replacement module 110 may simply delete individual component 210 from application package 208 before or after storing the decomposed files within application package 208.

In some operating systems, it may be necessary to preserve the attributes of components of an application package throughout the encryption process so that the components may be called during runtime. The systems described herein accomplish this task by creating encrypted, decomposed files that match critical attributes of unencrypted individual components. While this may enable an application to call a file (i.e., the primary encrypted file) that matches the attributes of the original file, the called file may not execute properly if it does not contain the entirety of the data stored in the original individual component or if the data within the file is encrypted. As such, the systems described herein may reverse the decomposition process described above by recomposing the primary and auxiliary encrypted files back into the encrypted file. In some examples, detection module 116 may recompose the primary and auxiliary encrypted files into encrypted file 212 statically at any time after the decomposition process. Alternatively, detection module 116 may dynamically recompose the primary and auxiliary files while application package 208 is executing.

In some embodiments, dynamically recomposing the primary and auxiliary encrypted files may involve detection module 116 detecting an attempt to access individual component 210. In response to detecting the attempt to access individual component 210, decomposition module 108 and encryption module 106 may recompose the primary encrypted file and the auxiliary encrypted file into encrypted file 212 and then decrypt encrypted file 212 to derive individual component 210. Upon recomposing and decrypting the encrypted file, the systems described herein may permit access to individual component 210.

In some examples, compression module 114 may determine that the decrypted individual component has been compressed. In these examples, compression module 114 may decompress the individual component before permitting access to the individual component.

In some embodiments, detection module 116 may detect the attempt to access individual component 210 by monitoring access to application package 208. Detection module 116 may monitor access to application package 208 in a variety of ways, including by intercepting a runtime call directed to application package 208. In such an example, detection module 116 may further detect and/or confirm the attempt to access individual component 210 by determining that the runtime call is directed to individual component 210.

In some embodiments, detection module 116 may detect that the runtime call is directed to individual component 210 by determining that the runtime call is directed to a component within application package 208 that matches both an offset value and a critical attribute associated with the individual component. For example, replacement module 110 may have stored the primary encrypted file in the same memory location that individual component 210 was originally stored within application package 208. In this example, the runtime call detected by detection module 116 may contain a call for a file with a file offset value that corresponds to the memory location in which individual component 210 was located. As the size and/or other critical attributes may be used to uniquely identify files during certain runtime operations, the runtime call may also include a call for a file containing the critical attribute that corresponds to individual component 210. If detection module 116 determines that the runtime call is directed to a component within application package 208 that matches both the offset value and the critical attribute associated with individual component 210, the systems described herein may both recompose and decrypt encrypted file 212. Detection module 116 may also determine that the runtime call is directed to individual component 210 and/or detect the attempt to access individual component 210 in any other suitable manner.

The systems and methods disclosed herein may be implemented in a variety of ways and provide a number of advantages. For example, by creating an encrypted file that matches the critical attributes of an unencrypted component of an application package, the systems and methods described herein may enable bundle encryption of the application package and therefore increase the security of the application package. In addition, the disclosed systems and methods may enable a computing device to correctly identify an encrypted version of an unencrypted component during runtime. Furthermore, by detecting attempts to access the encrypted versions of unencrypted components, the systems and methods described herein may combine and decrypt created files such that application package components execute correctly.

Figure 6:
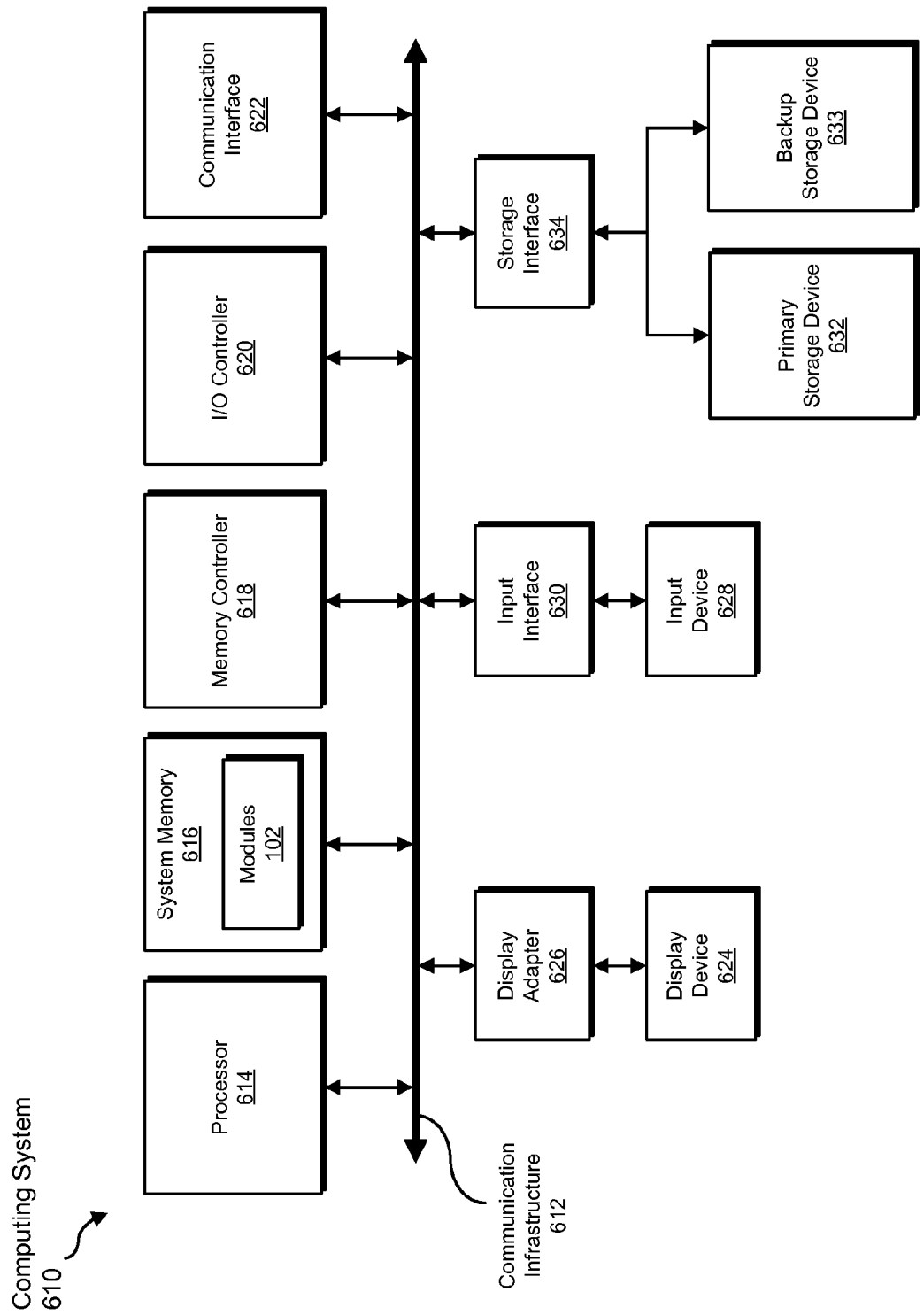
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
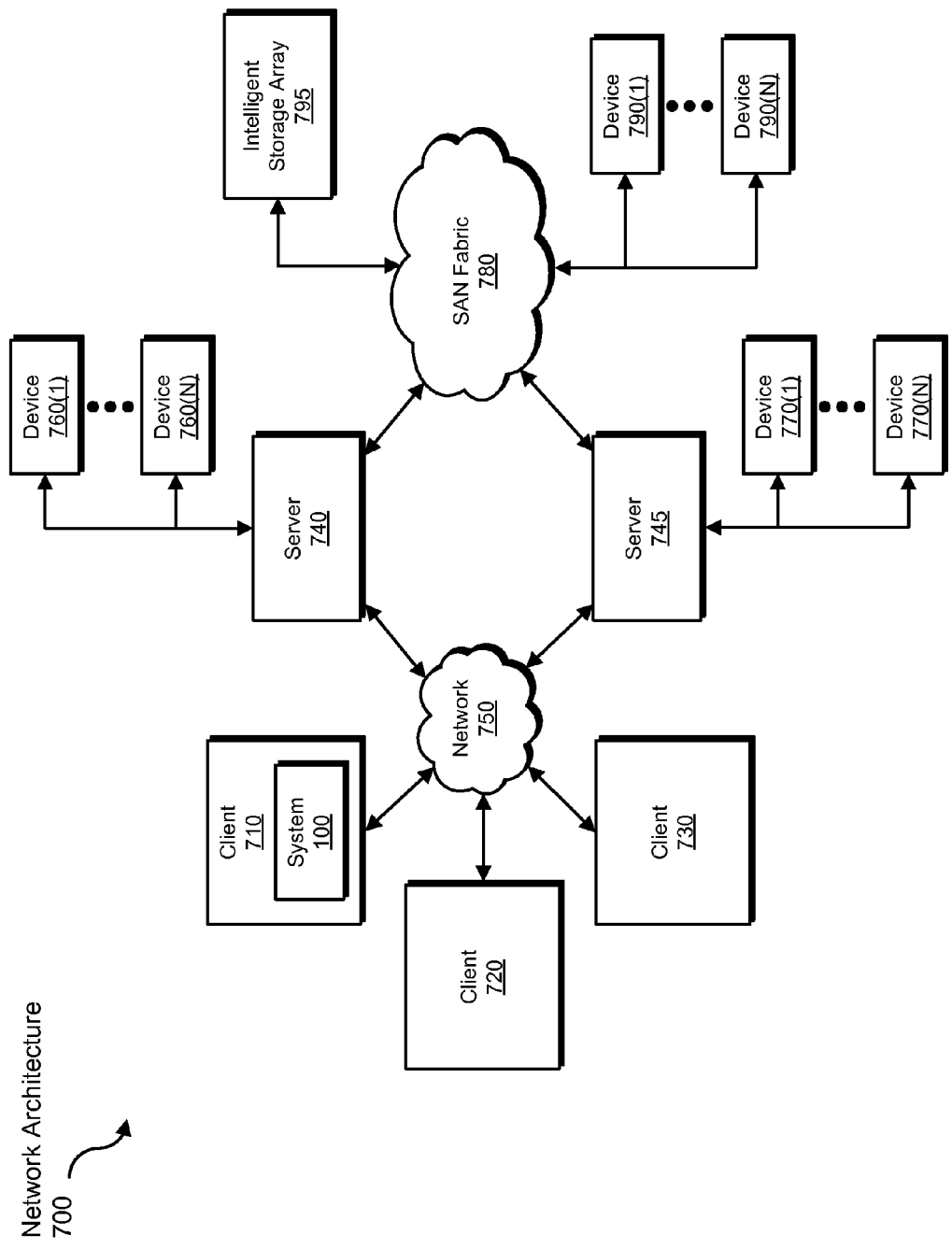
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for managing encrypted files within application packages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smart-watches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive components of an application package, transform the components into encrypted files, transform the encrypted files into one or more additional encrypted files, and transform the additional encrypted files back into executable files. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing encrypted files within application packages, at least a portion of the method being performed by a computing device comprising at least one processor, the method comprising:
   identifying an individual component within an application package that requires encryption;
   creating, by encrypting the individual component, an encrypted file;
   decomposing the encrypted file into:
      a primary encrypted file that contains an initial portion of the encrypted file that matches a critical attribute of the individual component;
      at least one auxiliary encrypted file that contains the remaining portion of the encrypted file;
   replacing, within the application package, the individual component with the primary encrypted file and the auxiliary encrypted file;
   after replacing the individual component with the primary encrypted file and the auxiliary encrypted file, detecting an attempt to access the individual component by:
   intercepting a runtime call to the application package;
   determining that the runtime call is directed to a component within the application package that matches both an offset value and the critical attribute of the individual component.

2. The method of claim 1, wherein decomposing the encrypted file comprises:
   determining that at least one critical attribute of the encrypted file does not match the critical attribute of the individual component;
   in response to determining that the critical attribute of the encrypted file does not match the critical attribute of the individual component, decomposing the encrypted file into the primary encrypted file and the auxiliary encrypted file.

3. The method of claim 1, wherein the critical attribute of the individual component comprises a size of the individual component.

4. The method of claim 1, wherein encrypting the individual component comprises:
   determining that the individual component has been compressed;
   directly encrypting the compressed individual component.

5. The method of claim 4, wherein directly encrypting the compressed individual component comprises:
   identifying a compression algorithm that was used to compress the individual component;
   directly extracting compressed data from the individual component without decompressing the compressed data;
   encrypting the compressed data, as extracted.

6. The method of claim 1, further comprising, prior to encrypting the individual component:
   determining that the individual component has been compressed;
   decompressing the individual component.

7. The method of claim 6, further comprising, upon decompressing the individual component:
   identifying the critical attribute of the individual component;
   recompressing the individual component.

8. The method of claim 7, wherein recompressing the individual component comprises:
   identifying a compression algorithm that was originally used to compress the individual component;
   recompressing the individual component using the same compression algorithm that was originally used to compress the individual component.

9. The method of claim 1, further comprising:
   in response to detecting the attempt to access the individual component:
      recomposing the primary encrypted file and the auxiliary encrypted file into the encrypted file;
      decrypting the encrypted file to derive the individual component;
   upon recomposing and decrypting the encrypted file, permitting access to the individual component.

10. The method of claim 9, wherein recomposing the primary encrypted file and the auxiliary encrypted file into the encrypted file comprises dynamically recomposing the primary encrypted file and the auxiliary encrypted file into the encrypted file while the application package is executing.

11. The method of claim 9, further comprising, upon decrypting the encrypted file and prior to permitting access to the individual component:
   determining that the individual component has been compressed;
   decompressing the individual component.

12. The method of claim 1, wherein intercepting the runtime call to the application package is performed while monitoring all access to the application package.

13. The method of claim 1, wherein the offset value of the individual component indicates a memory location in which the individual component was located before being encrypted.

14. A system for managing encrypted files within application packages, the system comprising:
   an identification module, stored in memory, that identifies an individual component within an application package that requires encryption;
   an encryption module, stored in memory, that creates an encrypted file by encrypting the individual component;
   a decomposition module, stored in memory, that decomposes the encrypted file into:
      a primary encrypted file that contains an initial portion of the encrypted file that matches a critical attribute of the individual component;
      at least one auxiliary encrypted file that contains the remaining portion of the encrypted file;
   a replacement module, stored in memory, that replaces, within the application package, the individual component with the primary encrypted file and the auxiliary encrypted file;
   a detection module, stored in memory, that detects, after the individual component is replaced with the primary encrypted file and the auxiliary encrypted file, an attempt to access the individual component by:

intercepting a runtime call to the application package;

determining that the runtime call is directed to a component within the application package that matches both an offset value and the critical attribute of the individual component;

at least one physical processor that executes the identification module, the encryption module, the decomposition module, the replacement module, and the detection module.

15. The system of claim 14, wherein the critical attribute of the individual component comprises a size of the individual component.

16. The system of claim 14, further comprising, in response to the detection module detecting the attempt to access the individual component, the decomposition module, the encryption module, and the detection module:

recompose the primary encrypted file and the auxiliary encrypted file into the encrypted file;

decrypt the encrypted file to derive the individual component;

upon recomposing and decrypting the encrypted file, permit access to the individual component.

17. The system of claim 16, wherein the decomposition module recomposes the primary encrypted file and the auxiliary encrypted file into the encrypted file by dynamically recomposing the primary encrypted file and the auxiliary encrypted file into the encrypted file while the application package is executing.

18. The system of claim 14, wherein the detection module intercepts the runtime call to the application package while monitoring all access to the application package.

19. The system of claim 14, wherein the offset value of the individual component indicates a memory location in which the individual component was located before being encrypted.

20. A non-transitory computer-readable medium comprising one or more computer-executable instructions that, when executed by at least one processor of a computing device, cause the computing device to:

identify an individual component within an application package that requires encryption;

create, by encrypting the individual component, an encrypted file;

decompose the encrypted file into:

a primary encrypted file that contains an initial portion of the encrypted file that matches a critical attribute of the individual component;

at least one auxiliary encrypted file that contains the remaining portion of the encrypted file;

replace, within the application package, the individual component with the primary encrypted file and the auxiliary encrypted file;

after replacing the individual component with the primary encrypted file and the auxiliary encrypted file, detect an attempt to access the individual component by:

intercepting a runtime call to the application package;

determining that the runtime call is directed to a component within the application package that matches both an offset value and the critical attribute of the individual component.

\* \* \* \* \*